(12) United States Patent
Koenck et al.

(10) Patent No.: US 8,160,251 B1
(45) Date of Patent: Apr. 17, 2012

(54) SCALABLE DISTRIBUTED SOFTWARE DEFINED RADIO (SDR) AND MISSION COMPUTING ARCHITECTURE

(75) Inventors: Steven E. Koenck, Cedar Rapids, IA (US); Allen P. Mass, Lisbon, IA (US); Julianne R. Crosmer, Cedar Rapids, IA (US); James A. Marek, Anamosa, IA (US); Carlen R. Welty, Solon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1249 days.

(21) Appl. No.: 11/488,995

(22) Filed: Jul. 19, 2006

(51) Int. Cl.
*G06F 21/00* (2006.01)

(52) U.S. Cl. ....... 380/255; 711/101; 455/84; 455/552.1; 713/176; 718/104

(58) Field of Classification Search .................. 380/255, 380/287
See application file for complete search history.

(56) References Cited

U.S. PATENT DOCUMENTS

| | | | | |
|---|---|---|---|---|
| 6,041,035 | A * | 3/2000 | Thedens | 370/217 |
| 6,072,994 | A * | 6/2000 | Phillips et al. | 455/84 |
| 6,353,846 | B1 * | 3/2002 | Fleeson | 718/104 |
| 6,389,078 | B1 * | 5/2002 | Hessel et al. | 375/259 |
| 7,509,141 | B1 * | 3/2009 | Koenck et al. | 455/552.1 |
| 2003/0194996 | A1 * | 10/2003 | Campbell | 455/431 |
| 2004/0087283 | A1 * | 5/2004 | Jones et al. | 455/103 |
| 2005/0100076 | A1 * | 5/2005 | Gazdzinski et al. | 375/130 |
| 2005/0108382 | A1 * | 5/2005 | Murotake et al. | 709/223 |
| 2005/0151518 | A1 * | 7/2005 | Schneiker et al. | 323/222 |
| 2006/0015674 | A1 * | 1/2006 | Murotake | 711/101 |
| 2006/0184855 | A1 * | 8/2006 | Wang et al. | 714/755 |
| 2007/0094508 | A1 * | 4/2007 | Palum et al. | 713/176 |
| 2007/0111718 | A1 * | 5/2007 | Palum et al. | 455/418 |

OTHER PUBLICATIONS

Leveraging Flexibility in Reconfigurable Baseband Processors for Resource Management in Software-Defined and Cognitive Radios|Joseph Gaeddert and Jeffrey H. Reed|Dec. 2, 2009| Session 4.1|http://groups.winnforum.org/p/cm/Id/fid=88.*

* cited by examiner

*Primary Examiner* — Taghi Arani
*Assistant Examiner* — Mahfuzur Rahman
(74) *Attorney, Agent, or Firm* — Donna P. Suchy; Daniel M. Barbieri

(57) ABSTRACT

A system providing a scalable distributed operating environment is provided. The system may include a cryptographic module for encrypting communications for transmission over an external network. Further, more than one classified processor may be communicatively coupled to the cryptographic module for handling classified processes and information. In addition, more than one unclassified processor may also be communicatively coupled to the cryptographic module for handling unclassified processes and information. The number of classified and unclassified processors activated upon selection of a waveform is dependent upon the degree of complexity of the waveform.

15 Claims, 6 Drawing Sheets

SCALABLE DISTRIBUTED SOFTWARE DEFINED RADIO (SDR) AND MISSION COMPUTING ARCHITECTURE

CROSS REFERENCE TO RELATED APPLICATIONS

The present invention is related to U.S. patent application Ser. No. 11/340,096, entitled "Embedded MILS Network," sent via Express Mail Envelope Number EV 764 985 752 US, filed on Jan. 26, 2006 and United States Patent Application entitled "Power Manageable Scalable Distributed MILS Computing Platform," sent via Express Mail Envelope Number EV 764 985 457 US, filed on Jul. 19, 2006. Both of the aforementioned applications are hereby incorporated by reference in their entireties.

FIELD OF THE INVENTION

The present invention relates to the field of computing and more particularly to a system and method for a distributed embedded computing architecture with scalable capacity and power consumption.

BACKGROUND OF THE INVENTION

Joint Tactical Radio Systems (JTRS) are a family of software defined radios that provide military users with voice, data and video communications as well as interoperability across the joint battle space. Such systems may be deployed in airborne platforms as well as selected maritime, fixed-station, and ground mobile platforms. The JTRS software defined radio (SDR) concept is built upon the use of modern object oriented distributed computing using the Software Communications Architecture (SCA) to define an open standard architecture for distributed execution of waveform software. The SCA governs the structure and operation of the JTRS, enabling programmable radios to load waveforms, run applications, and be networked into an integrated system. The term waveform refers to all of the characteristics and behaviors of a particular radio communication protocol. In an SDR, the implementation of a particular waveform is by software instructions executing on programmed digital signal processors and general purpose processors. Each SDR may store these software programs in memory, and may at any time dynamically load the desired waveform program and configuration into the receiver and transmitter channels.

In order to perform the desired waveform generation and processing, encryption, signal processing and major communication functions, JTRS platforms have traditionally included processors that are large enough to accommodate the most complex waveforms. This approach is limited by its lack of scalability. For example, the worst case waveform may be several times more difficult and computationally intense than the more typical waveform, however, the same amount of power is consumed for simple waveform generation and processing as for the most complex.

Therefore, it would be desirable to provide a system and method for implementing a scalable SCA operating environment such that waveforms ranging from relatively simple to very complex may be executed on a processing platform that could scale to meet the computing and power consumption demands.

SUMMARY OF THE INVENTION

Accordingly, the present invention is directed to a method and system for providing a scalable SCA operating environment allowing computing and power consumption demands to be scaled.

In a first aspect of the invention, a system providing a scalable distributed operating environment is provided. In the ensuing description, "node" refers to a physical processor, while "process" refers to an individual thread of execution on a particular node. It is further understood that each node can support one or more processes, each potentially executing programs at different security levels. The system may include a cryptographic module for encrypting communications for transmission over an external network. Further, more than one classified processor may be communicatively coupled to the cryptographic module for handling classified processes and information. In addition, more than one unclassified processor may also be communicatively coupled to the cryptographic module for handling unclassified processes and information. The number of classified and unclassified processors activated upon receiving a waveform is dependent upon the degree of complexity of the waveform.

In a further aspect of the invention, a system for providing a scalable operating environment is provided. In such aspect, the system includes a first software defined radio (SDR) channel and a second SDR channel. Both the first SDR and the second SDR channels each include at least one classified processor for handling classified information and at least one unclassified processor for handling unclassified information. The classified processors and unclassified processors are scaled so that the processing capacity is sufficient to meet the processing throughput demands of the application while minimizing power and computer processing resources.

In an additional aspect of the invention, a method for providing a scalable SCA operating environment such that waveforms ranging from relatively simple to very complex may be executed on a processing platform that could scale to meet the computing and power consumption demands is provided. In the present aspect, the method includes a software defined digital implementation of a communication waveform, a waveform being defined as a particular set of radio protocols. The method may also entail identifying the complexity of the waveform and activating one or more SCA Processing Engines (SCAPEs) depending upon the complexity of the waveform. Further, the method may involve executing the waveform with the one or more SCAPEs. In addition, one or more SCAPEs may be activated to implement mission computing applications. Mission computing applications may include, but are not limited to, sensor processing, mission control, information management, and the like.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
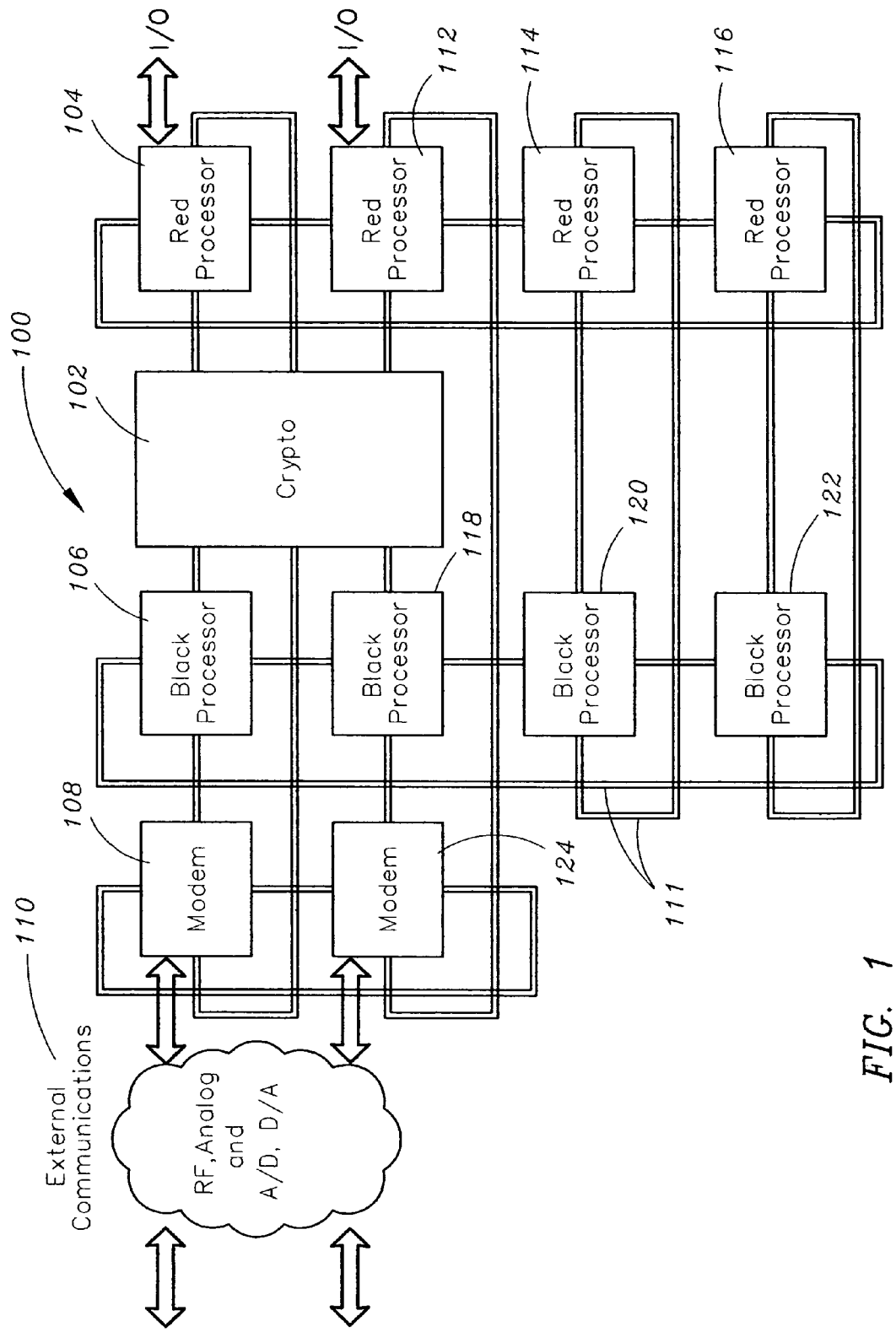
FIG. 1 is a block diagram of a scalable SCA operating environment including a cryptographic module in accordance with an exemplary embodiment of the present invention.

Reference will now be made in detail to the presently preferred embodiments of the invention, examples of which are illustrated in the accompanying drawings.

Wireless communication in a military setting requires the integration of many communication sources including mobile devices such as handheld platforms or the like to enable high portability. For example, personnel in remote areas often require devices that are easily carried on their person. Wireless communication may be obtained from various external sources, including fixed and mobile land based transmitters, satellites, airborne platforms, and the like. It is to be appreciated that these devices may utilize various portions of the electromagnetic spectrum to communicate. External communication networks allow personnel carrying out diverse tasks to communicate with each other. Providing widely available mobile communication is problematic as the users have different security requirements, as well as constrained power sources. System hardware and software architecture must ensure segregation of applications based on their respective security levels. In some instances, a communication point may require several levels of security to allow the relevant personnel to communicate. For example, a handheld communication device may communicate with a first remote source via unsecure communication and may then communicate with a second remote source via a classified or top secret communication.

Software defined radio (SDR) communication processing often requires high throughput to handle complex communication waveforms. Communication devices in these situations may also act as a convergence system, which may perform additional tasks having differing security requirements. Exemplary additional applications may include mission planning, sensor processing, navigation functions, and the like. The system and method of the present invention permit offloading of portions of the system infrastructure to reduce processing overhead and direct more of the capacity of the processor toward execution of the application code.

Some processing tasks do not require high throughput. Low throughput tasks may waste energy in comparison to the application to be completed by using only a small portion of the processor's capacity for actual application processing, and utilizing the remaining portion simply idling or waiting for a stimulus event. A mobile device wasting power reduces the operational life of the device before recharging or battery replacement is required. In contrast to the present system 100, a previous device may expend power unnecessarily when running a simple application, particularly if its processor has limited power management features such as slow processor clock modes, subsystem power off, and the like. This often occurs when devices are configured to have sufficient throughput to support the most complex and computationally demanding applications expected to be run. These high performance devices consume power rapidly and shorten the operational life of the device. The system 100 and method of the present invention minimize the power and computer processing required for each particular application by scaling the processing capacity to be just sufficient to meet the processing throughput demands of the application via a distributed computing architecture over a local processor-to-processor network.

Referring to FIG. 1, an exemplary embodiment of a system 100 providing efficient management of power consumption for processing tasks requiring varying processor capacity is described. As illustrated in FIG. 1, the system 100 may include a cryptographic module 102 for encrypting communications for transmission over an external network. Unclassified communication may be transmitted without encryption to enable efficient data handling for large amounts of communications that do not include sensitive information. Communication of classified information is encrypted to ensure protection of sensitive information.

In the present embodiment, the system 100 includes at least one red processor 104 for handling classified processes and information and at least one black processor 106 for handling unclassified processes and information. It is contemplated that black (unclassified or encrypted) and red (classified) processes and information may be supported by a single processor with an appropriately designed and certified Partition Management Unit (PMU) operating to enforce separation. For example, a Multiple Independent Levels of Security (MILS) individual processor includes a red process for handling classified processes and information level and a black process for handling unclassified or encrypted processes and information. Communication between the unclassified process and other processing levels having the same "unclassified" level of security, included on other processes, may occur without encryption. Communicating unclassified data via non-encrypted communication may permit increased communication efficiency including power management as the information is passed without the overhead associated with encrypting and decrypting the passed data.

Messaging including processor security level data may be utilized to initiate changes to the power management profiles for the processors within the system. For example, a multiple bit classification code corresponding to a processor security level is included with a power management change request message to prevent power management changes from being transferred by a lower processor security level to a higher processor security level. The MILS separation system implementation must support the highest processor level, e.g., "Top Secret", while managing power consumption. Dedicated hardware and software resources enforcing MILS separation may be utilized.

An individual processor may be configured with independent partitioned processing levels. For example, the AAMP7G processor manufactured by Rockwell Collins, Cedar Rapids, Iowa implements a National Security Agency (NSA) certified brick wall Partition Management Unit (PMU) to enforce separation. The processor architecture is configured to enforce separation to ensure compliance with security level requirements while also implementing power management. For instance, a first processor node includes a first processing security level and a second processing security level which is different from the first processing security level. The processor node may include a block of hardware with corresponding software for forming a processor-to-processor interface for communicating with other processor nodes to offload the distributed computing infrastructure processing and therefore maximize the available processor performance. Additional processing security levels may be included in the processor node through "N" processing security levels. The first processing security level may be reserved for top secret applications (those having the highest level of security for the system 100); while the second processing security level may be implemented for unsecure or unclassified communications and processing. In an exemplary embodiment, the processor partitions may allow for processor sharing in a time division multiplexed (TDM) manner. Other processing security levels may be implemented based on the system requirements. For instance, three processing security levels, such as top secret, secret, and unclassified may be included in a processor. Each security level may be physically partitioned from the other security levels and implement an independent operating environment. Additional partitions may be included within a security level. For instance, a top secret security level is divided into an "A" portion and a "B" so that independent processes are conducted while enforcing separation between the portions included in the security level. In the previous example, the "A" portion is capable of handling SDR communication while the "B" portion handles mission planning task. In this manner, separation exists to ensure security between the processes is not compromised. Independent separation may be achieved through the implementation of a real time operating system (RTOS) having a small kernel. In the foregoing example, each of the processing security levels utilizes simplified kernel level software, in comparison to widely available OS platforms (which are configured to accomplish a wide variety of tasks), thus minimizing the respective processing capacity needed for each processing security level. In an exemplary embodiment, the kernel level software programmed on each particular processing security level is independent of kernel software for every other processing security level.

Processor security level separation may be guaranteed through the utilization of a partitioned processor with temporal separation occurring in accordance with TDM methodology and spatial separation occurring in accordance with memory access enforcement. For instance, a partition management unit (PMU) is implemented to enforce process separation. A PMU may prevent a malfunction within one partition from impacting other non equivalent partitioned portions. In an exemplary embodiment, the processors (102 through 108) support the Object Modeling Group (OMG) common object request broker architecture (CORBA) standard for networking applications over the network 111. Multilevel security (MLS) issues may be addressed through the utilization of multiple independent levels of security (MILS). Utilization of an embedded hardware-based network routing scheme permits scaling of processing capacity while ensuring separation compliance.

Individual processors may be configured to address differing security level applications in a distributed manner to maximize power efficiency. For example, a distributed system 100 in accordance with the present invention may implement a processor having lower power demands in comparison to previous systems that implemented a processor having a throughput gauged to meet or exceed the requirements mandated by the most complex expected application. Previous system implementations have typically included processors that far exceed the actual processing capacity required to meet the most computationally intensive process. In general, these systems exhibit poor power efficiency unless the application demands the full capacity of the processor. In the current invention, the processing capacity may be scaled to meet the demands of high throughput applications with relatively higher power consumption. For less processor intensive applications, the processing capacity may scaled downward to perform the required computing tasks with relatively lower power consumption.

Processing capacity may be scaled based on the application, for example, processors 112, 114, 116, 118, 120 and 122 are implemented in a scaled fashion to address various levels of computationally intensive applications. The external network communications 110 are typically wireless communication waveforms and may be interfaced to the various processors via a modem. For example, modems 108 and 124 perform digital filtering, demodulation and other signal processing operations. It is contemplated that multiple modems may be used to implement SDR channels and provide redundancy. It is further contemplated that the system 100 may be utilized for mission computing applications including sensor processing, mission control, information management and the like.

Figure 2A:
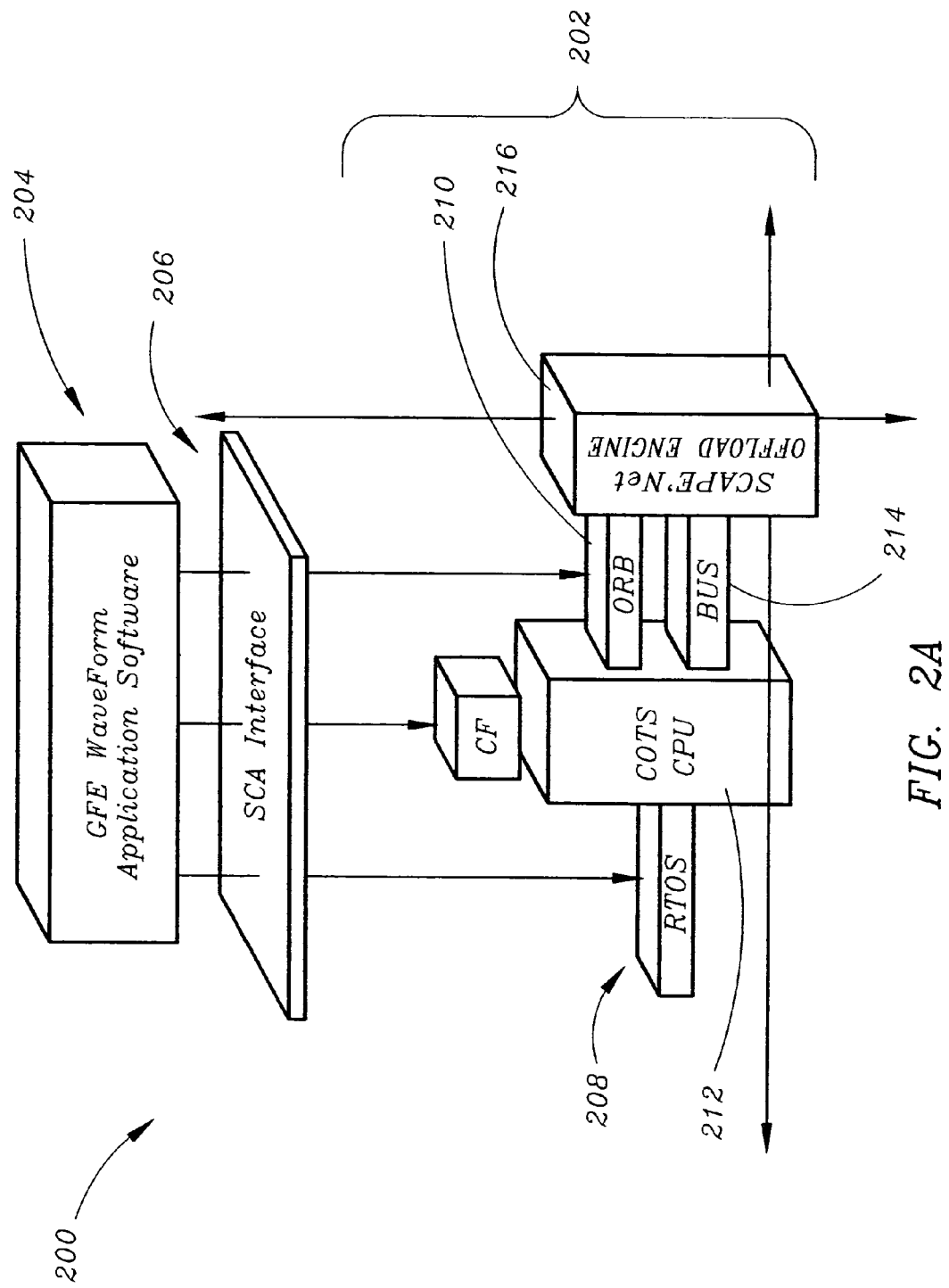
FIG. 2A is a block diagram of a scalable SCA Processing Engine (SCAPE) node in accordance with an exemplary embodiment of the present invention.

Referring to FIG. 2A, an exemplary SCAPE node 200 is provided. As illustrated in FIG. 2A, the SCAPE node may include a block of computing elements 202 with corresponding application software 204 (e.g., Government Furnished Equipment (GFE) Waveform Application Software) for a processor interface (e.g., SCA interface) for communicating with other processor nodes to offload operating environment software to maximize application execution performance in a distributed manner. The block of computing elements 202 may include a Real Time Operating System (RTOS) 208 to provide the real time services required for SDR implementation. Further, the block of computing elements 202 may include an object request broker (ORB) 210 to support distributed computing functions over the network. For instance, the ORB 210 implements the CORBA standard previously described above. In additional embodiments, the SCAPE node 200 may include a commercial off-the-shelf processing unit (COTS CPU) 212 communicatively coupled to the RTOS 208, the ORB 210 and a bus 214 in order to perform the instruction, logic, and mathematical processing in the node 200. Moreover, in an exemplary embodiment, the ORB 210 and the bus 214 communicatively couple the COTS CPU 212 with a SCAPE Net Offload Engine 216. An exemplary SCAPE Net Offload Engine 216 may comprise a switched fabric network interface and control, a network transport layer implementation, and portions of the ORB implemented in hardware. These functional elements each perform computing functions that are typically implemented in software, which consumes some portion of the total computing capacity of the COTS CPU 212. The effect of the SCAPE Net Offload Engine 216 is to relieve much of the operating environment computing that is normally implemented in the COTS CPU 212 so that more of its computing capacity is available for application software processing.

Figure 2B:
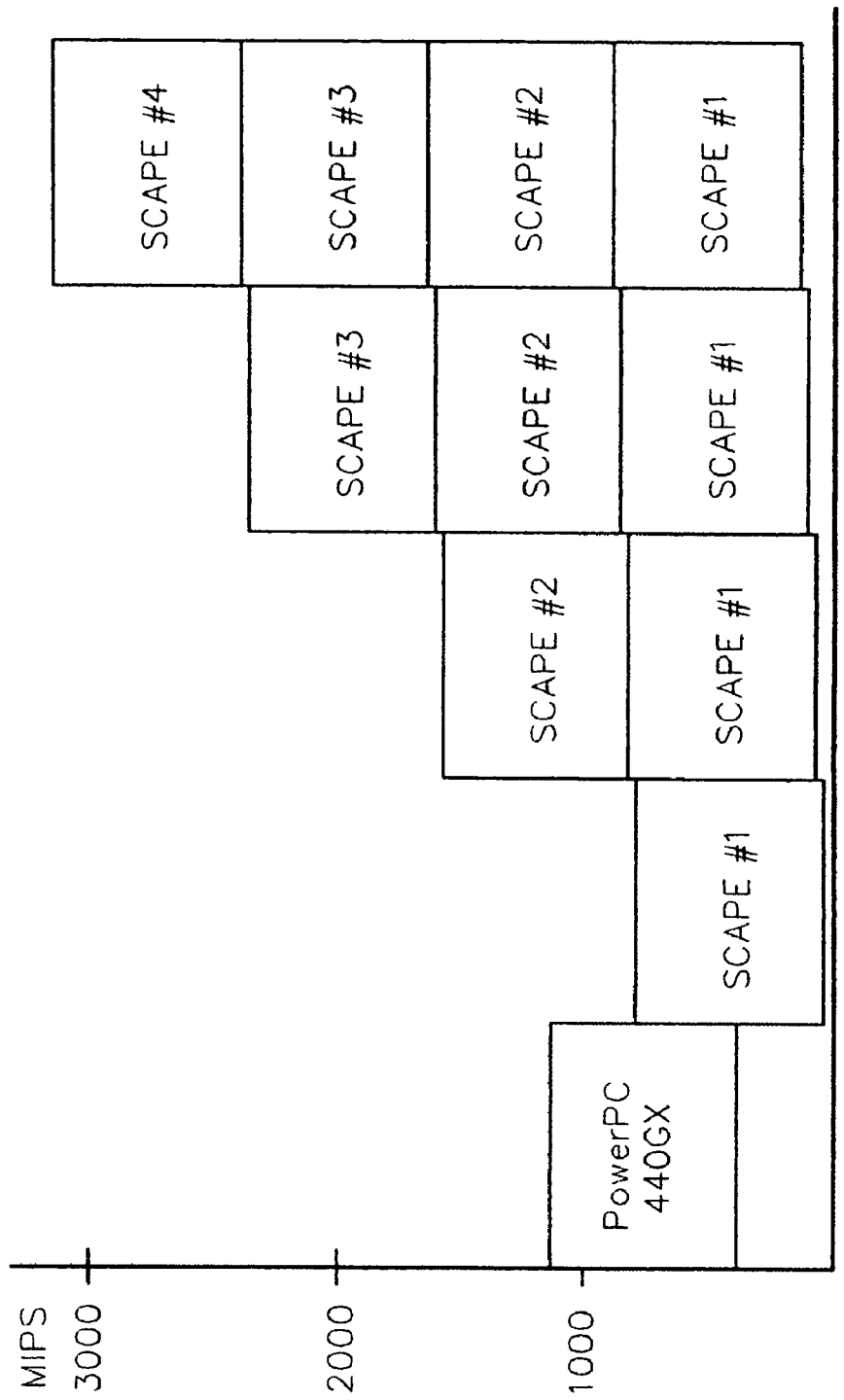
FIG. 2B is a graphical depiction of the computing performance of a scalable SCA Processing Engine (SCAPE) operating environment compared to a general purpose processor.

Referring to FIG. 2B, a graphical depiction of the scalable SCA Processing Engine (SCAPE) operating environment in comparison to an exemplary single general purpose microprocessor such as a PowerPC 440GX is provided. The computing capacity and power consumption of the PowerPC 440GX are somewhat scalable by selection of the processor clock speed, but are relatively limited due to the limitations imposed by requirements for high maximum performance. As illustrated in FIG. 2B, the scalable SCAPE operating environment may include multiple SCAPEs. As the complexity of an operation increases as expressed in millions of instructions per second (MIPS), the number of SCAPEs activated to perform the operation increases. For example, the complexity of the waveform is indicated by a parameter associated with the waveform. Further, the clock speed of classified and unclassified processors that are activated upon selection of a waveform is determined by the parameter associated with the waveform. The present configuration allows processing capacity to be scaled as well as power consumption in which the number of processors required and utilized varies depending upon the complexity of the operation (e.g., waveform to be generated, processed, and other like communication processes).

Figure 3:
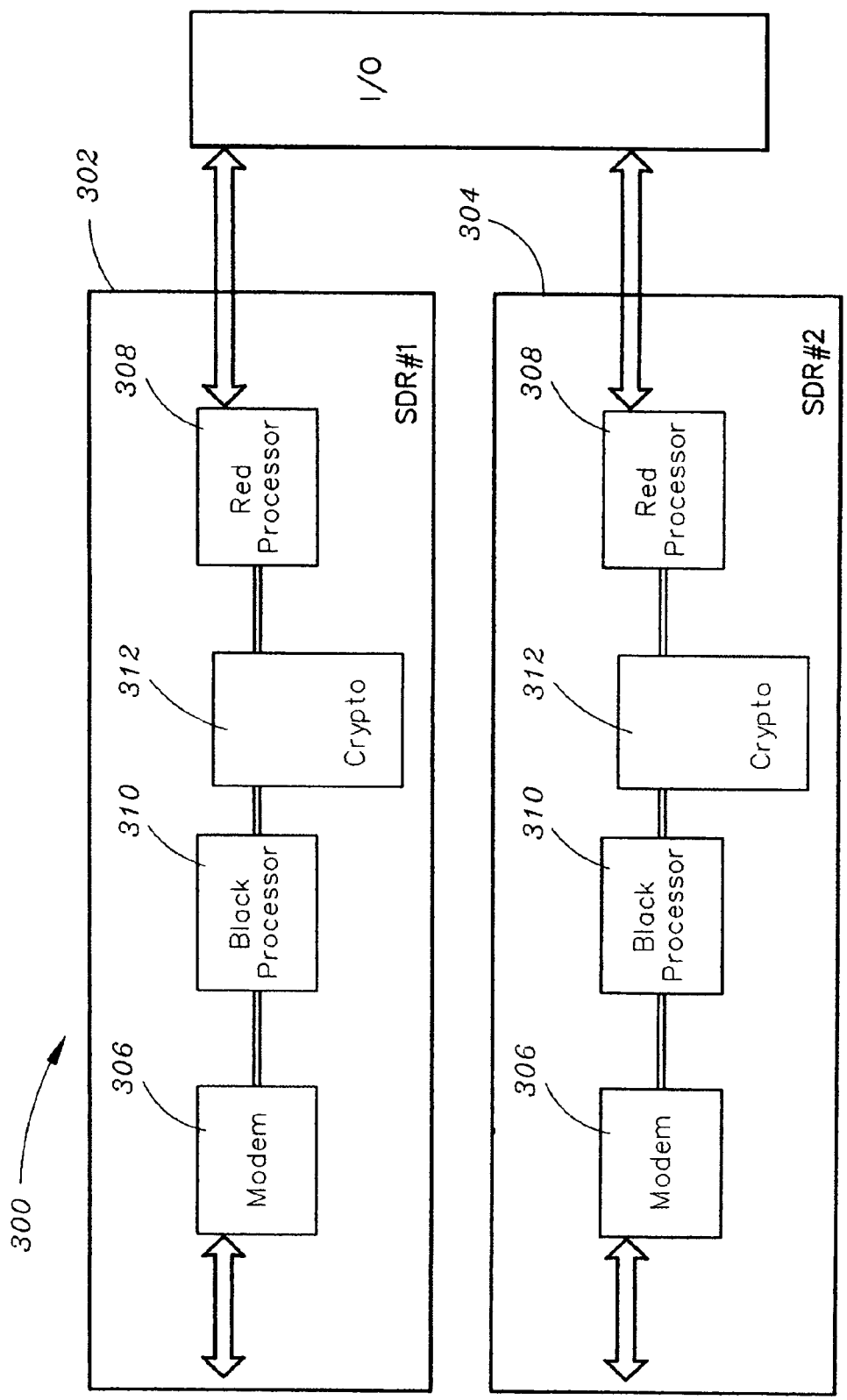
FIG. 3 is a block diagram of a scalable SCA operating environment including a cryptographic module in accordance with an exemplary embodiment of the present invention.

Referring to FIG. 3, an additional system 300 for providing computing performance and power scaling is provided. In an exemplary embodiment, the system 300 includes a first SDR channel 302 and a second SDR channel 304. Each SDR channel includes a modem 306 for providing signal processing functions and an interface between external communications and other system processors. Further, each SDR channel includes at least one red processor 308 for handling classified processes and information and at least one black processor 310 for handling unclassified processes and information. It is to be understood that black (unclassified or encrypted) and red (classified) processes and information may be supported by a single processor with an appropriately designed and certified Partition Management Unit (PMU) operating to enforce separation.

In addition, each SDR channel disposed within the system 300 includes a cryptographic unit 312 for encrypting communications for transmission over an external network. As previously stated, unclassified communications may be transmitted without encryption to enable efficient data handling for large amounts of communications that do not include sensitive information. Alternatively, communication of classified information may be encrypted to ensure protection of sensitive information. It is contemplated that the crypto channels 312 may be implemented by a Rockwell Collins Janus Crypto Engine or an equivalent device.

Figure 4:
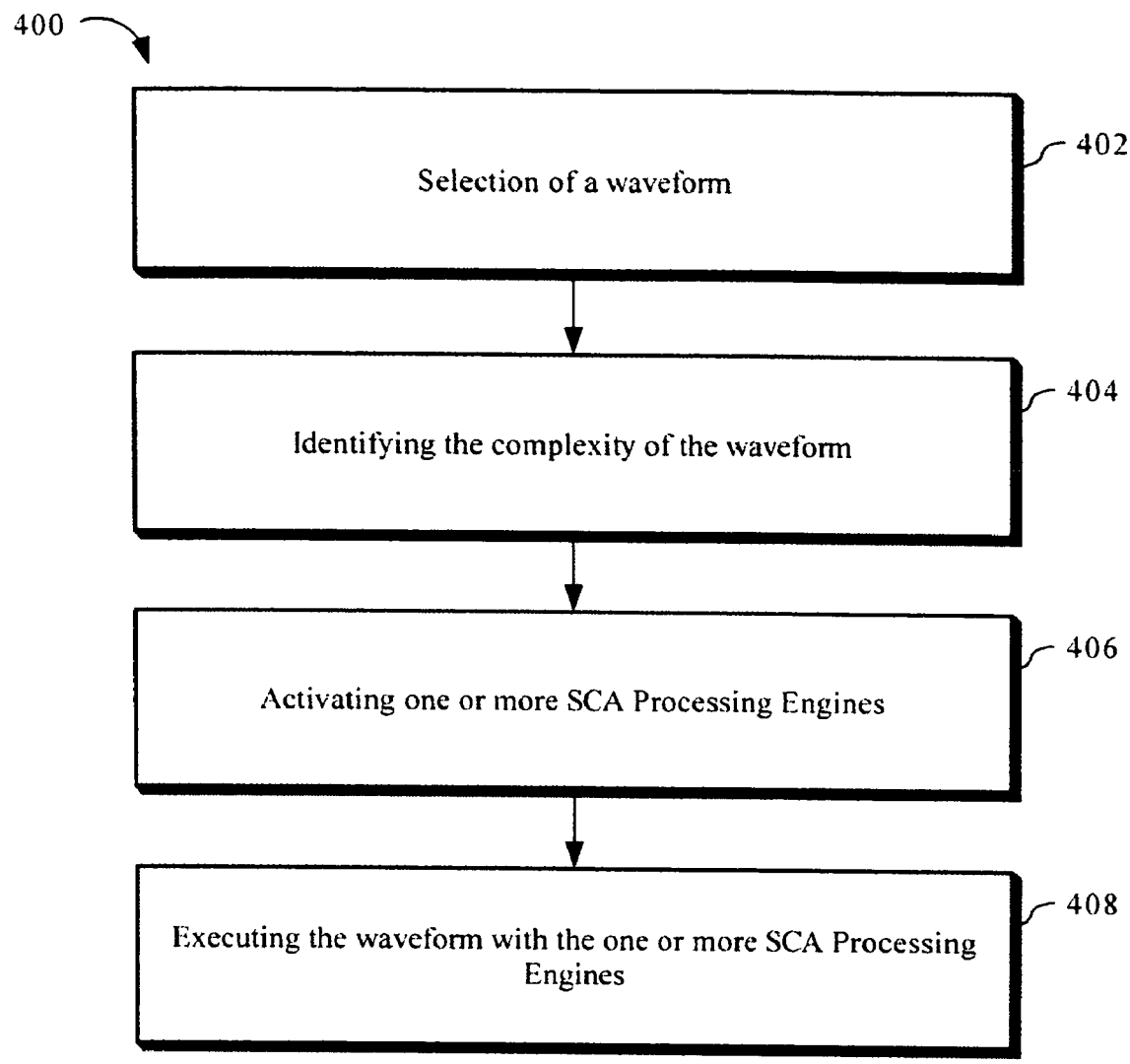
FIG. 4 is a flow diagram illustrating a method for providing a scalable SCA operating environment.

Referring to FIG. 4, a method 400 for providing a scalable SCA operating environment such that waveforms ranging from relatively simple to very complex may be executed on a processing platform that could scale to meet the computing and power consumption demands is provided. In an exemplary embodiment, the method 400 includes selection of a communication waveform 402, a waveform being defined as a particular set of radio protocols. The method 400 may also entail identifying the complexity of the waveform 404 and activating one or more SCAPEs depending upon the complexity of the waveform 406. For instance, a simple waveform only triggers one SCAPE whereby a highly complex waveform activates four SCAPEs. Further, the method 400 may involve executing the waveform with the one or more SCAPEs 408.

Figure 5:
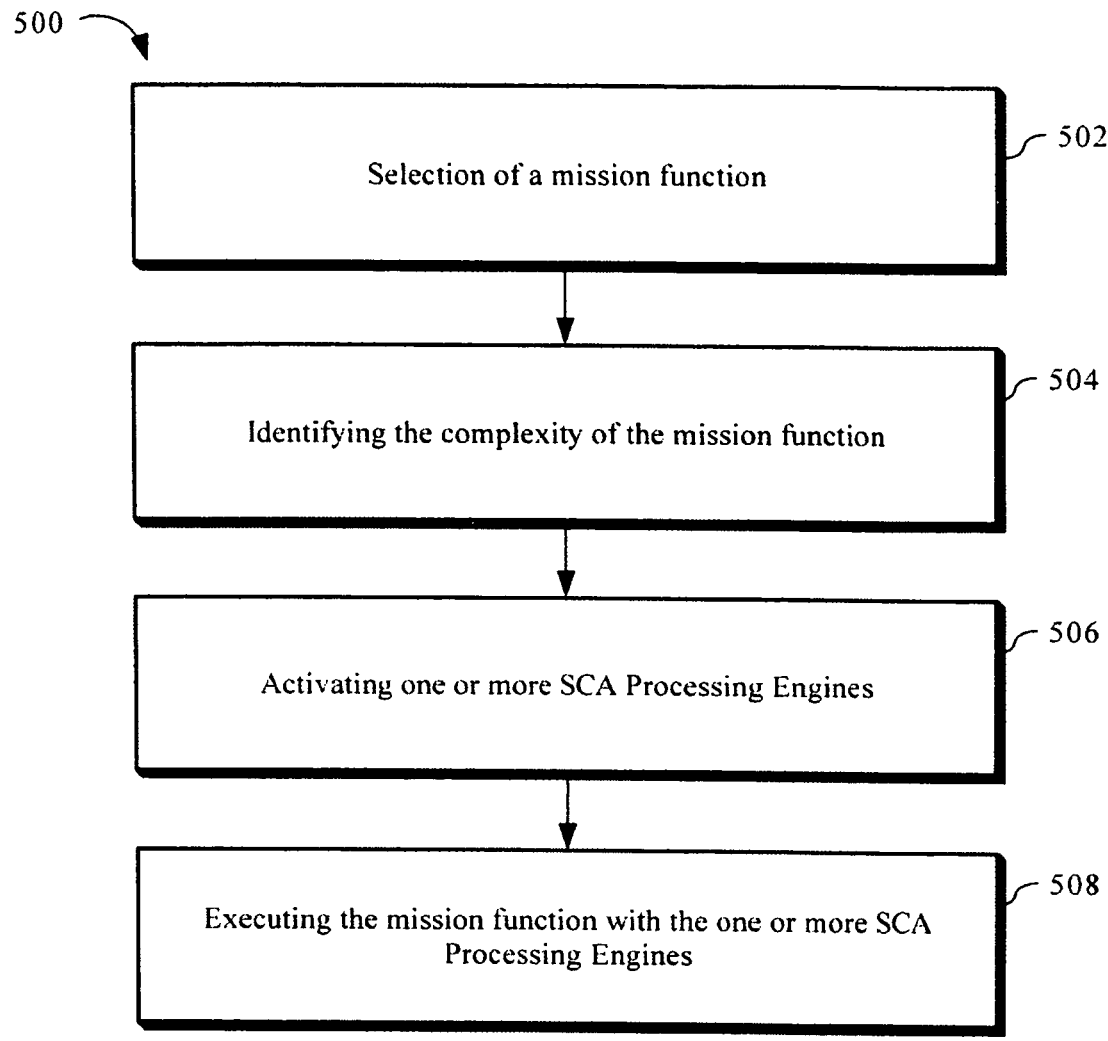
FIG. 5 is a flow diagram illustrating a method for providing a scalable mission computing environment.

Referring to FIG. 5, a method 500 for providing scalable mission computing functions by activating one or more SCAPEs to perform mission computing applications is provided. In an exemplary embodiment, the method 500 includes selection of a mission computing function 502. Mission computing functions may include, but are not limited to, sensor processing, mission control, information management, and the like. The method 500 may also entail identifying the complexity of the mission function 504 and activating one or more SCAPEs depending upon the complexity of the mission function 506. For instance, a simple mission function only triggers one SCAPE whereby a highly complex mission function activates four SCAPEs. Further, the method 500 may involve executing the mission computing function with the one or more SCAPEs 508.

It is contemplated that the present system and method may be implemented in a scalable processing architecture for applications in military as well as other environments where power management is required.

Further, it is contemplated that the specific order or hierarchy of steps in the methods disclosed are exemplary approaches. Based upon design preferences, it is understood that the specific order or hierarchy of steps in the method may be rearranged while remaining within the scope of the present invention. The accompanying method claims present elements of the various steps in a sample order, and are not meant to be limited to the specific order or hierarchy presented.

It is believed the method and system of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described is merely an explanatory embodiment thereof. It is the intention of the following claims to encompass and include such changes.

What is claimed is:

1. A system providing a scalable distributed operating environment, comprising:
    a cryptographic module for encrypting communications for transmission over an external network;
    a communication device for providing an interface to external communications and more than one classified and unclassified processes;
    a plurality of multiple independent levels of security (MILS) processors configured to execute a red process for handling classified processes and information and a black process for handling unclassified or encrypted processes and information, the plurality of MILS processors further including a partition management unit (PMU) operating to enforce separation, wherein a number of classified and unclassified processes activated upon selection of a waveform is dependent upon a degree of complexity of the waveform, the degree of complexity of the waveform is indicated by a parameter associated with the waveform, wherein a selected number of MILS processors of said plurality of MILS processors are activated and a clock speed of said selected number of MILS processors of said plurality of MILS processors activated upon selection of the waveform is determined by the parameter associated with the waveform.

2. The system of claim 1, wherein the system is implemented in a software defined radio.

3. The system of claim 1, wherein the system is utilized to implement a mission computing application.

4. The system of claim 3, wherein the mission computing application includes at least one of sensor processing, mission control, or information management.

5. The system of claim 1, wherein the system is implemented in a Joint Tactical Radio System (JTRS).

6. A system, comprising:
    a communication device for providing an interface to external communications and more than one classified and unclassified processes;
    a first software defined radio (SDR) channel; and
    a second SDR channel communicatively coupled to the first SDR channel, the first SDR channel and the second SDR channel each including a plurality of classified processors for handling classified information and a plurality of unclassified processors for handling unclassified information,
    wherein a cryptographic module is disposed in the first SDR channel and the second SDR channel for encrypting communications for transmissions on an external network and a selected number of the plurality of classified processors and a selected number of the plurality of unclassified processors are activated so a processing capacity is sufficient to meet processing throughput demands while minimizing power and computer processing resources, a clock speed of the selected number of classified and the selected number of unclassified processors that are activated is determined by the processing throughput demands, the processing throughput demands based upon a degree of complexity of a received waveform, the degree of complexity of a waveform determined by a parameter associated with the waveform.

7. The system of claim 6, further comprising at least one modem for providing an interface to external communications.

8. The system of claim 6, wherein the system is utilized to implement a mission computing application.

9. The system of claim 8, wherein the mission computing application includes at least one of sensor processing, mission control, or information management.

10. The system of claim 6, wherein the system is implemented in a Joint Tactical Radio System (JTRS).

11. A method for providing a scalable operating environment, comprising:
   selecting a waveform from a cryptographic module for encrypting communications for transmission over an external network using a communication device to provide an interface to external communications and more than one classified and unclassified processes;
   identifying waveform complexity;
   activating one or more processes, a number of processes activated via a plurality of multiple independent levels of security (MILS) processors including a red process for handling classified processes and information level and a black process for handling unclassified or encrypted processes and information, the plurality of MILS processors further including a partition management unit (PMU) operating to enforce separation, each of the one or more activated processes being dependent upon a degree of complexity of the waveform; and
   executing the waveform with a selected number of the plurality of MILS processors, wherein the degree of complexity of the waveform is indicated by a parameter associated with the waveform, wherein the selected number of the plurality of MILS processors for executing the waveform and a clock speed of said selected number of the plurality of MILS processors is determined by the parameter associated with the waveform.

12. The method of claim 11, wherein the method is implemented in a software defined radio.

13. The method of claim 11, further comprising activating the selected number of the plurality of MILS processors to implement a mission computing function.

14. The method of claim 13, wherein the mission computing function includes at least one of sensor processing, mission control, or information management.

15. The method of claim 11, wherein the method is implemented in a Joint Tactical Radio System (JTRS).

* * * * *